United States Patent [19]
Hoffman

[11] 3,970,912
[45] July 20, 1976

[54] BATTERY CHARGING CIRCUIT
[76] Inventor: Philip A. Hoffman, 514 Piccadilly Road, Towson, Md. 21204
[22] Filed: Dec. 26, 1974
[21] Appl. No.: 536,490

Related U.S. Application Data
[63] Continuation of Ser. No. 392,225, Aug. 28, 1973, abandoned.

[52] U.S. Cl. .................................. 320/2; 310/50; 320/39; 320/DIG. 1; 323/22 T
[51] Int. Cl.² ......................................... H02J 7/10
[58] Field of Search .............. 323/22 T; 320/39, 40, 320/DIG. 1, 2–5, 56, 22–24; 310/50

[56] References Cited
UNITED STATES PATENTS

| | | | |
|---|---|---|---|
| 3,257,568 | 6/1966 | Diener | 323/22 T |
| 3,602,794 | 8/1971 | Westhaver | 320/39 |
| 3,876,921 | 4/1975 | Bigbee | 320/39 X |

Primary Examiner—J D Miller
Assistant Examiner—Robert J. Hickey
Attorney, Agent, or Firm—LeBlanc & Shur

[57] ABSTRACT

Disclosed is a battery operated hand tool which has incorporated directly into its housing a novel battery charging circuit. The charger normally operates off a conventional household power outlet and comprises a solid state switching circuit for recharging the battery with a series of electrical impulses. In some special cases, it can be operated in a non-switching state. External inductance is eliminated by charging the battery through the hand tool motor.

18 Claims, 14 Drawing Figures

BATTERY CHARGING CIRCUIT

This is a continuation of application Ser. No. 392,225 filed Aug. 28, 1973, now abandoned.

This invention relates to a battery charging circuit for battery operated or so called cordless hand tools and more particularly is directed to a simplified and inexpensive battery charger which may be incorporated directly into the hand tool.

Battery operated hand tools such as electric shavers, grass shears, electric drills and the like are evidencing an increased popularity largely due to the convenience afforded by these so called cordless devices. Devices of this type are customarily provided with a small electric motor energized by one or more rechargeable battery cells incorporated within the tool housing along with the electric drive motor for the tool. The elimination of the conventional electrical cord for connecting the tool to an electric outlet increases the freedom with which the user of the tool may move about, eliminates the inconvenience of clearing the power cord from obstacles with which it may become intangled, and reduces the necessity for always having an electrical outlet available. This latter feature can be an important advantage for those who travel or may spend time in remote locations where a convenient electrical power outlet is not always readily available.

Because of the not insignificant amount of electrical power drawn by even one of the small electric motors in a cordless hand tool and because of the limited amount of power available from the relatively small batteries incorporated in devices of this type it has become customary to provide the cordless hand tools with rechargeable batteries so as to avoid the necessity for frequent battery replacement. Present day rechargeable batteries if properly maintained with a sufficient charge have an extended life and greatly enhance the convenience with which these tools may be operated.

Since most cordless hand tools operate from a battery potential of only a few volts, it has been thought necessary in the past to recharge the batteries from a convential 117 volt 60 Hz electrical outlet through a voltage step down transformer. These transformers are necessarily of substantial size and increase not only the size but also the cost and weight of the battery charger. The size and weight of the battery charger, in particular the step down transformer, has made it impossible to incorporate the charging circuit directly into a hand tool and for this reason most cordless hand tools are provided with separate battery chargers. The separate battery charger represents both an added cost factor in the price of the hand tool and an inconvenience in handling and storage as well as packaging of the charger.

The present invention overcomes these difficulties by providing a charging circuit for the small batteries of a hand operated tool of simplified and inexpensive construction and one which in particular eliminates the relatively bulky and heavy voltage step down transformer incorporated in previous battery chargers of this type. Because of its simplicity and small size and weight the battery charger of the present invention may be incorporated directly into the housing of the hand tool without significantly increasing its cost and weight or size so that no provision need be made for packaging, handling, or storing a separate battery charger. When recharging of the hand tool batteries is necessary a simple cord connection to a conventional 117 volt household outlet is sufficient to recharge the tool batteries.

In the present invention the tool batteries are recharged from a conventional household outlet through a novel transistor switching circuit which normally supplies a series of periodic recharging impulses to the batteries at voltage and current levels compatible with the low voltage nickel-cadmium batteries conventionally used in present day cordless hand tools. These impulses are supplied to the battery through the inductance of the electric motor of the hand tool which while customarily quite small, has found to be sufficient to provide charging effeciences equal to and even exceeding those of the more expensive and bulky separate chargers presently in use. It has been discovered that even the small inductance of a permanent magnet electric motor which in some hand tools may be as small as 50 microhenries or less is sufficient for use in the transistor switching charger of this invention.

It is therefore one object of the present invention to provide an improved battery charger for recharging the relatively small batteries of a hand tool or the like from a conventional 117 volt household outlet.

Another object is to provide a hand tool battery charger which can be operated both from AC and DC.

Another object of the present invention is to provide an improved switching type battery charger for hand tools which eliminates the need for a step down transformer or other external inductance.

Another object of the present invention is to provide a pulse charging circuit for the batteries of battery operated electrical motors which applies the charging pulses to the battery through the motor inductance.

Another object of the present invention is to provide a simplified, inexpensive, small and light-weight battery charger which may be incorporated directly into the housing of a hand tool without significantly increasing its cost, size or weight.

Another object of the present invention is to provide a battery operated or cordless hand tool which may be recharged by a simple cord connection to a conventional 117 volt AC electrical power outlet.

Another object of the present invention is to provide a simplified and inexpensive battery charger which may be manufactured at least for the most part as an integrated circuit.

These and further objects and advantages of the invention will be more apparent upon reference to the following specification, claims and appended drawings wherein:

Figure 1:
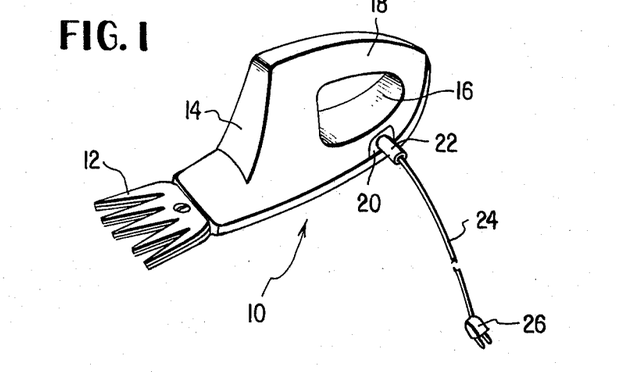
FIG. 1 is a perspective view of a hand tool in the form of a battery operated grass shear constructed in accordance with the present invention.

Referring to the drawings, FIG. 1 shows a cordless or a battery operated hand tool in the form of a grass shear or a grass clippers 10. The grass shears 10 comprise the shearing blades 12 supported from a housing 14 which is appertured as at 16 to provide an integral handle portion 18. Within the housing 14 is an electric motor connected to drive blades 12 and a power supply battery for the motor all as more fully shown in FIG. 2. On the side of the housing 14 is a socket 20 which acts as a receptacle for a power supply plug 22 connected to one end of a power supply cord. The other end of cord 24 contains the usual prongs 26 for insertion into a conventional 117 volt, 60 Hz household power outlet. During normal operation the plug 22 is removed from the socket 20 but when the battery is to be recharged the cord 24 is connected to the household outlet and plug 22 inserted into socket 20 to recharge the battery. When charging has been completed plug 22 is removed.

Figure 2:
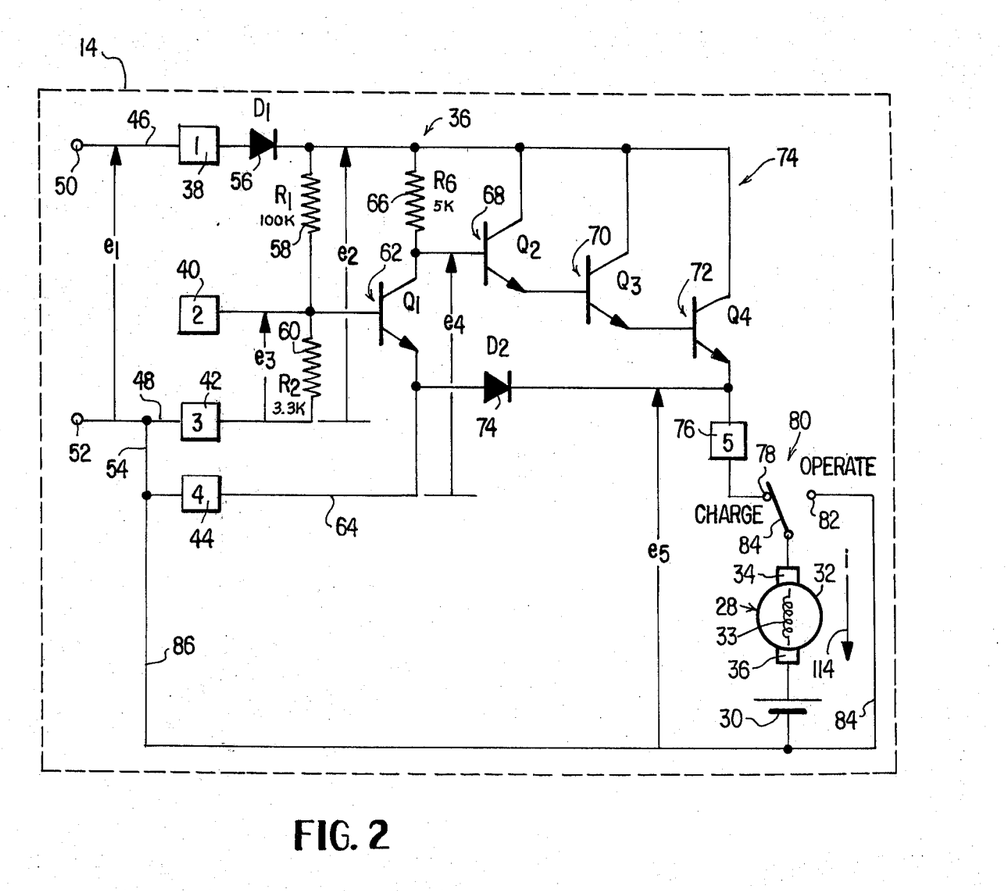
FIG. 2 is a circuit diagram of the basic charging circuit of the present invention as incorporated in the housing of the hand tool of FIG. 1.

FIG. 2 is a detailed circuit diagram of the basic charging circuit of the present invention adapted to be incorporated into the housing 14 of the grass shears 10 of FIG. 1. Also shown in FIG. 2 is the electric motor 28 for driving the shear blades 12 and the motor energizing battery 30. By way of example only, motor 28 may be a small permanent magnet electric motor having an armature 32 with inductive windings 33 to which electrical connection is established by the motor brushes 34 and 36. Battery 30 in this embodiment may comprise four conventional 1.3 volt nickel-cadmium rechargeable battery cells in series to provide a battery voltage of approximately 5.2 volts when fully charged.

The battery charging circuit generally indicated at 36 in FIG. 2 comprises four terminals 38, 40, 42 and 44 labeled 1, 2, 3 and 4 respectively in FIG. 2. Terminals 38 and 42 are connected by leads 46 and 48 to the power supply terminals 50 and 52 of the receptacle 20 of FIG. 1. The 117 volt 60 Hz AC electrical energy supplied by way of cord 24 of FIG. 1 is developed across the receptacle terminals 50 and 52 and applied to the charging terminals 38 and 42 labeled 1 and 3 respectively. In the embodiment of FIG. 2 terminal 40 is not used and remains disconnected whereas terminal 44 is electrically connected to terminal 42 by a short lead 54.

The AC signal from the power supply is applied through a rectifier diode 56 to a pair of resistors 58 and 60 forming a resistance divider. The junction of resistors 58 and 60 is connected to the base of NPN junction transistor 62 labeled Q1 which forms a switching transistor in the charging circuit. The emitter of transistor 62 is connected to terminal 44 by a lead 64 and connected to the collector of transistor 62 is a resistor 66. Connected between the resistor 66 and the collector of transistor 62 is the base of a second NPN junction transistor 68 labeled Q2. Transistor 68 along with transistors 70 and 72 labeled Q3 and Q4 respectively form a three transistor Darlington circuit 74. Connected between the emitter transistor 62 and the emitter of Darlington transistor 72 is a second rectifier diode 74.

The emitter of Darlington transistor 72 is connected through a fifth terminal 76 to one contact 78 of a manually operated single pole double throw switch 80. Movable contact 84 of the switch is manually movable between stationary contact 78 and a second stationary contact 82 returned by a lead 84 to the negative side of battery 30. The windings 33 of motor armature 32 are connected by way of armature brushes 34 and 36 in series with battery 30 and the movable contact 84 of switch 80. Switch 80 is preferably mounted on the housing 14 of FIG. 1 so that it may be manually moved by the operator between the charge and run positions. If desired, a second manually operated on/off switch may be provided in the lead 84 so that the motor can be turned on and off when movable contact 84 engages stationary contact 82. Finally the negative side of battery 30 is connected to terminals 42 and 44 by a lead 86.

In operation the 117 volt 60 Hz AC electrical energy from a conventional household power outlet is developed across terminals 38 and 42. This is applied through resistor 58 and 60 to the base of switching transistor 62 and whenever the voltage at the base of transistor 62 is positive and less than approximately +0.6 volt, transistor 62 is cut off and conventional current flows from terminal 38 through rectifier diode 56, resistor 66 and into the Darlington amplifier formed by transistors 68, 70 and 72. The output stage of this amplifier, namely transistor 72 connects the battery and the motor in series across the power source.

When the voltage at the base of transistor 62 becomes equal to or greater than approximately +0.6 volt, transistor 62 conducts through its emitter-collector circuit thereby turning the Darlington amplifier 74 off and disconnecting the battery and motor armature from the power source.

Figure 3:
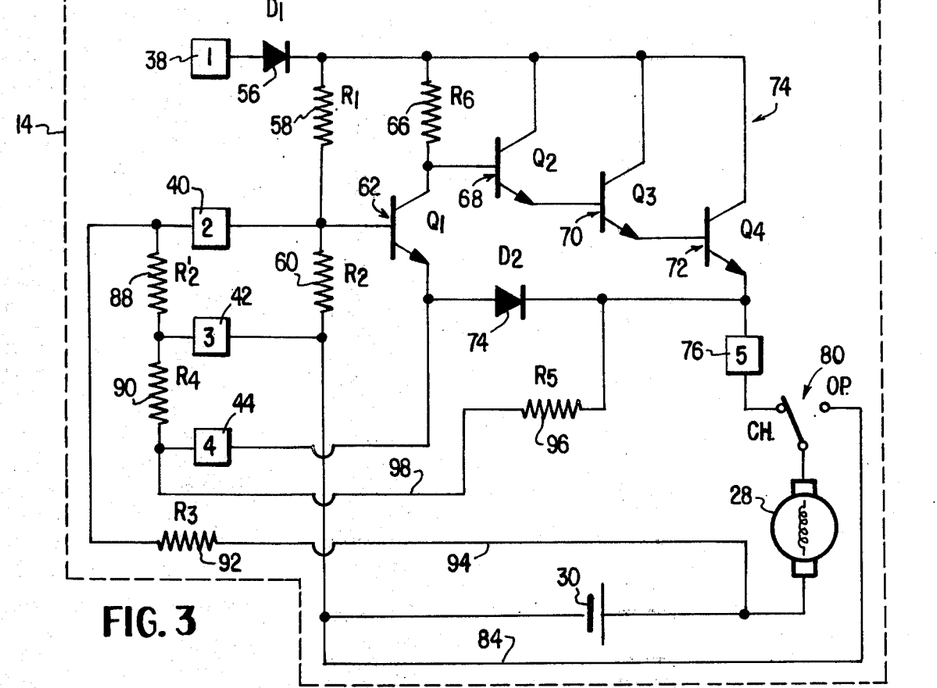
FIG. 3 is a circuit diagram similar to that of FIG. 2 of the battery charging circuit in accordance with the present invention incorporating additional resistors for automatic charging.

FIG. 3 shows a modified embodiment of the charging circuit of the present invention in which like parts bear like reference numerals. The same basic charging circuit is used in the embodiment of FIG. 3 but the circuit is modified through the use of additional resistors to provide for automatic charging. The modified circuit of FIG. 3 is useful when it is desired to charge batteries more rapidly and an automatic charging rate is desirable. This causes the battery to charge rapidly when it has been discharged. In the embodiment of FIG. 3 the charging rate decreases as the battery accumulates charge and after the battery has become charged the charging rate is small enough to prevent overcharging of the battery. This is accomplished in this embodiment by adding to the basic circuit of FIG. 2 the four resistors in FIG. 3 labeled R'2, R3, R4 and R5. Resistor 88 labeled R' is connected between terminals 40 and 42 and resistor 90 labeled R4 is connected between terminals 42 and 44. A resistor 92 labeled R3 is connected by a lead 94 between positive side of the battery 30 and the terminal 40. Finally, a resistor 96 labeled R5 is connected by a lead 98 between terminals 44 and 76.

The basic operation of the embodiment of FIG. 3 is the same as that previously described with respect to the embodiment of FIG. 2 and will not be repeated. Resistor 92 connected between the positive side of the battery 30 and the switching transistor 62 provides negative feedback to the base of the transistor to reduce the charging rate as the battery voltage increases. Resistor 88 is a shunt to resistor 60 to re-adjust the dividing ratio of the resistance divider as appropriate.

Resistors 90 and 96 provide a positive feedback to the emitter of switching transistor 62 to cancel transient potentials across battery 30 caused by the impulses of charging current through the battery.

Figure 4:
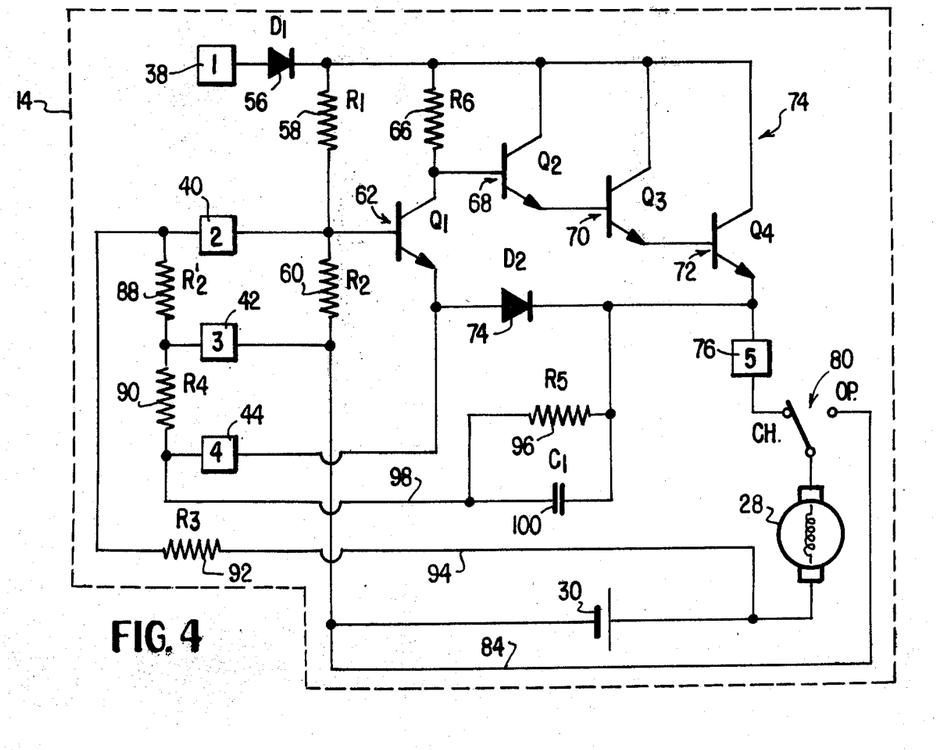
FIG. 4 is a circuit diagram similar to FIG. 3 of a modified charging circuit incorporating a capacitor for increasing the switching speed or the pulse rate of the charger.

FIG. 4 shows a further modified embodiment of the present invention again with like parts bearing like reference numerals. The charging circuit of FIG. 4 is identical to that of FIG. 3 previously described with the exception that in FIG. 4 a capacitor 100 is connected in parallel with positive feedback resistor 96. This capacitor acts to speed up the switching of the Darlington amplifier 74 from the "on" to the "off" condition and vice-versa. If capacitor 100 is made sufficiently large this capacitor causes a regenerative blocking oscillation in the circuit so as to provide one or more additional bursts of charge into battery 30 for each cycle of energy from the power source with a high efficiency.

Figure 5A:
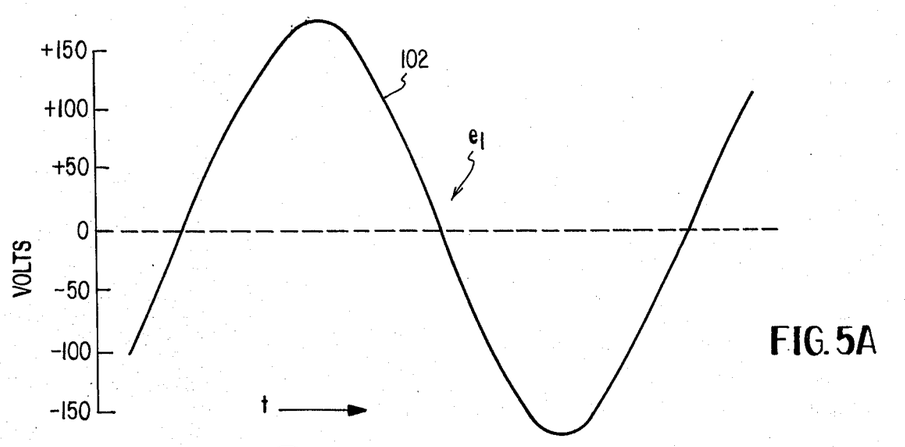
FIGS. 5A through 5F show voltage and current waveforms for the charging circuit of FIG. 2.
Figures 5B, 5C:
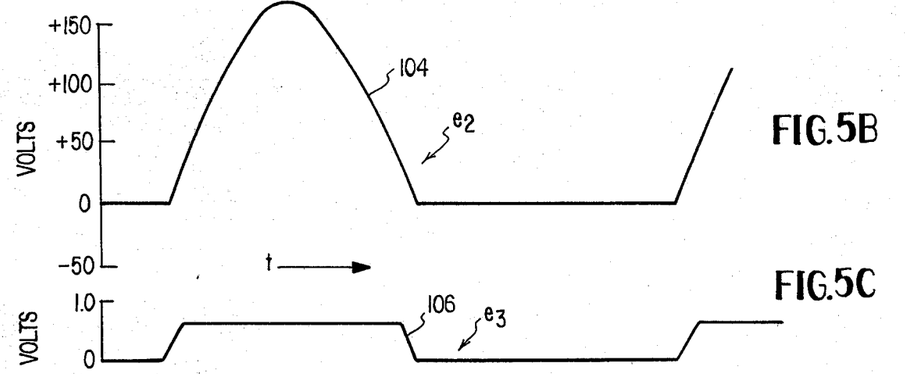
Figure 5D:
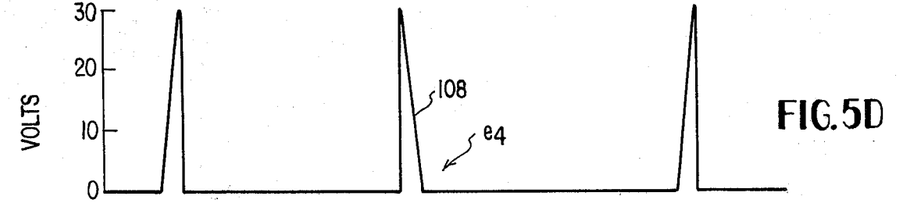

FIGS. 5A through 5F show voltage and current waveforms for the basic charging circuit of FIG. 2. FIG. 5A shows the conventional 117 volt 60 Hz AC input from a conventional household outlet labeled $e_1$ and indicated by the voltage waveform 102. This voltage $e_1$ is developed across the input terminals 38 and 42 as illustrated in FIG. 2. FIG. 5B shows the rectified input 104 representing the potential $e_2$ developed across divider resistors 58 and 60 of FIG. 2. FIG. 5C shows the waveform 106 which is the potential $e_3$ appearing at the base of switching transistor 62 (Q1). Waveform 108 in FIG. 5D is the potential $e_4$ which is the voltage at the collector of Q1 and at the base of Q2 forming the first transistor stage of the Darlington amplifier. As can be seen from FIG. 5D this waveform constitutes a series of unidirectional electrical impulses at twice the frequency of the 60 Hz input.

Figure 5E:
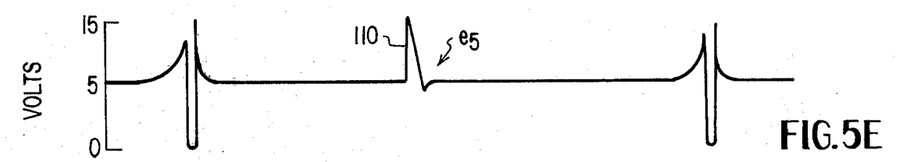
Figure 5F:
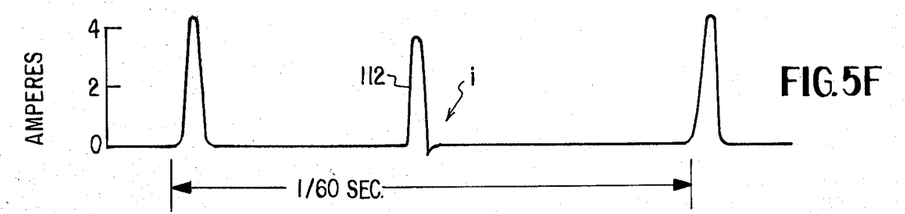

Waveform 110 of FIG. 5E is the voltage $e_5$ at the emitter of the last stage of the Darlington amplifier i.e., at the emitter of Q4. The current impulses into the battery and motor armature from Q4 are illustrated by the current waveform of FIG. 5F as indicated 112. Conventional current flow for the charging current i illustrated in FIG. 5F is in the direction of the arrow 114 in FIG. 2.

It is apparent from the above that the present invention provides a novel pulse charging circuit for small rechargeable batteries and in particular makes it possible to recharge batteries of this type from a conventional household electrical power outlet without the necessity of a voltage step down transformer. It requires no external inductance and therefore may be constructed completely of integrated circuits. It has been found that even the very small inductance available in just the armature of a permanent magnetic electric motor suitable for driving a small hand type power tool is sufficient to permit charging efficiencies equal to and even greater than previous charging arrangements using transformer and/or other charging inductance external to the electric motor.

The basic charging circuit of FIG. 2 is usable with all types of cordless hand power tools and has been successfully operated with a Black & Decker model 8280 cordless electric grass shear, with a Black & Decker model 7076 cordless electric drill, and with a Remington Lektronic II model 30S-110 cordless electric shaver. The component values shown in FIG. 2 are typical and all transistors by way of example only may be the type identified as GE-32. The rectifier diodes shown in the drawing may be of the type identified as GE-510. The divider ratio R2/(R1 + R2) is selected in the circuits to provide the desired "on" time for the Darlington amplifier 74. This divider ratio is adjusted in the embodiment of FIGS. 3 and 4 by the added resistor 88 in parallel with resistor 60 (R2). By way of example only the on time for the Remington shaver was selected to be 0.3 millisecond and for the Black & Decker grass shear it was 0.45 millisecond.

While the circuit is described in conjunction with discrete components it is particularly adapted to be manufactured completely from integrated circuits. When formed from integrated circuits it may be desirable to add a further stage to the Darlington amplifier 74 and to correspondingly modify the value of resistor 66 so as to reduce the heat generated in that resistor which is the one which consumes the most power.

Figure 6:
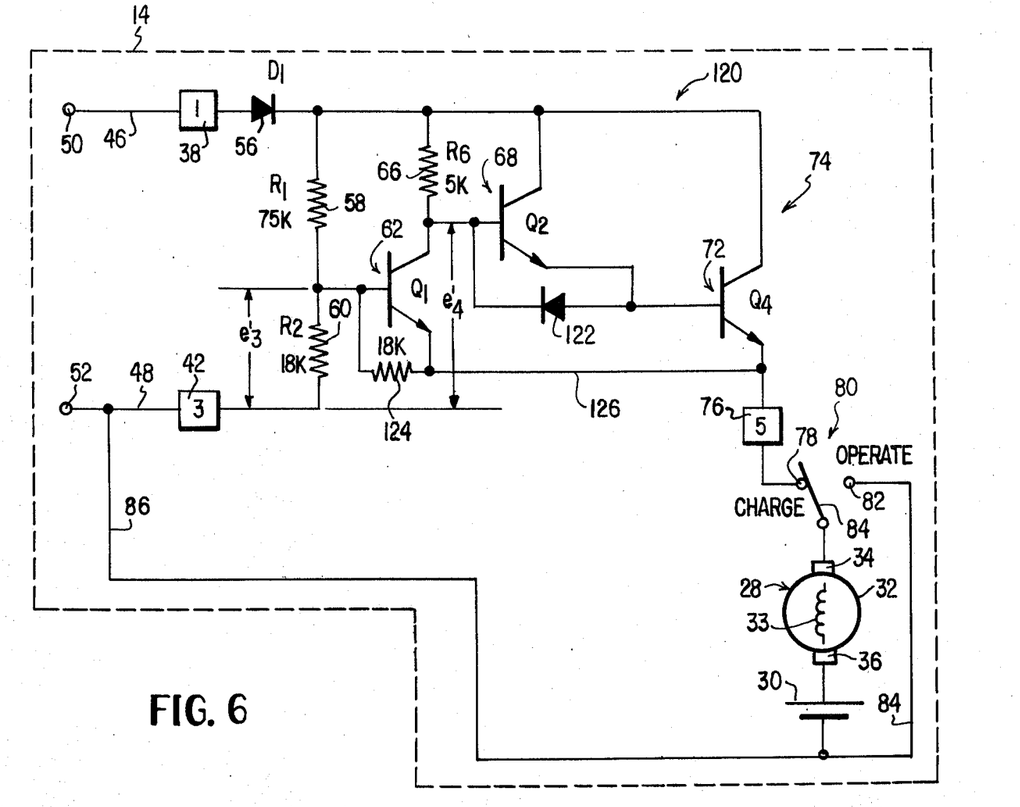
FIG. 6 is a circuit diagram of a modified basic charging circuit consructed in accordance with the present invention.

FIG. 6 shows a modified basic charging circuit construction in which like parts bear like reference numerals. The circuit generally indicated at 120 in FIG. 6 is again completely contained within the housing 14 and is generally similar to the charging circuit 36 of FIG. 2 previously described. However, the circuit of FIG. 6 importantly differs from the circuit of FIG. 2 in that with the circuit of FIG. 6 the motor inductance 33 and the battery 30 are connected in the emitter return circuit of transistor 62 (Q1). In this way the inductance of the motor causes the inductive spikes of voltage to aid in the switching process thereby producing more rapid switching from on to off and vice-versa. This makes possible a more simplified circuit since it makes it possible to eliminate one of the transistors of the Darlington amplifier such as the transistor 70 of FIG. 2 and the same time provides a more efficient circuit.

The operation of the circuit of FIG. 6 is otherwise essentially the same as the operation of the circuit of FIG. 2 and the description will not be repeated. Again, when transistor 62 (Q1) in FIG. 6 is conducting the Darlington transistor circuit 74 is turned off and when the switching transistor 62 turns off the Darlington transistor circuit is on to connect the motor and battery to the power supply terminals 50 and 52. In FIG. 6 the values of the divider resistors 58 and 60 are modified to be 75 kilohms and 18 kilohms respectively, so that whenever the voltage at the base of transistor 62 is positive and less than approximately +5.8 volts, transistor 62 is cut off and conventional current flows from terminal 38 through rectifier diode 56, resistor 66 and into the Darlington amplifier formed by transistors 68 and 72 in FIG. 6. The output stage of this amplifier, i.e., transistor 72 connects the battery and motor in series across the power source. When the voltage at the base of transistor 62 becomes equal to or greater than approximately +5.8 volts, transistor 62 conducts through its emitter-collector circuit whereby turning the Darlington amplifier off and disconnecting the battery and motor armature from the power source. A diode 122 which by way of example only, may be of the type identified as GE-510 is connected between the base and emitter of transistor 68. In addition, an 18 kilohm resistor 124 is connected between the base and emitter of switching transistor 62. The emitter of this transistor is connected to terminal 76 by way of a lead 126.

Figure 8A:
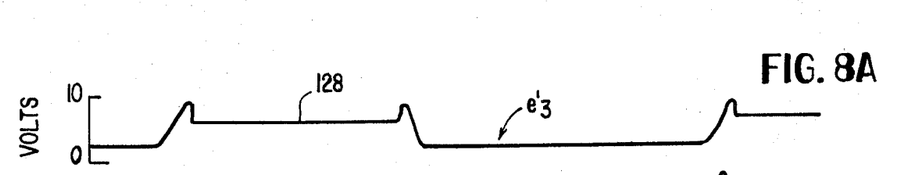
FIGS. 8A and 8B show voltage waveforms for the modified charger of FIG. 6.
Figure 8B:
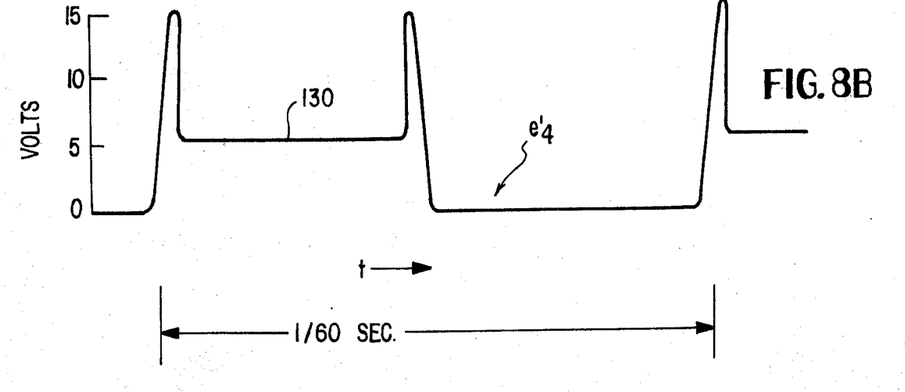

The voltage $e_3{'}$ which is the voltage across resistor 60 in FIG. 6 and therefore the voltage at the base of switching transistor 62 is shown by the voltage waveform 128 in FIG. 8A whereas the voltage $e_4{'}$ in FIG. 6 which is the voltage at the base of the first stage Darlington transistor 68 is illustrated by the waveform 130 of FIG. 8B.

Figure 7:
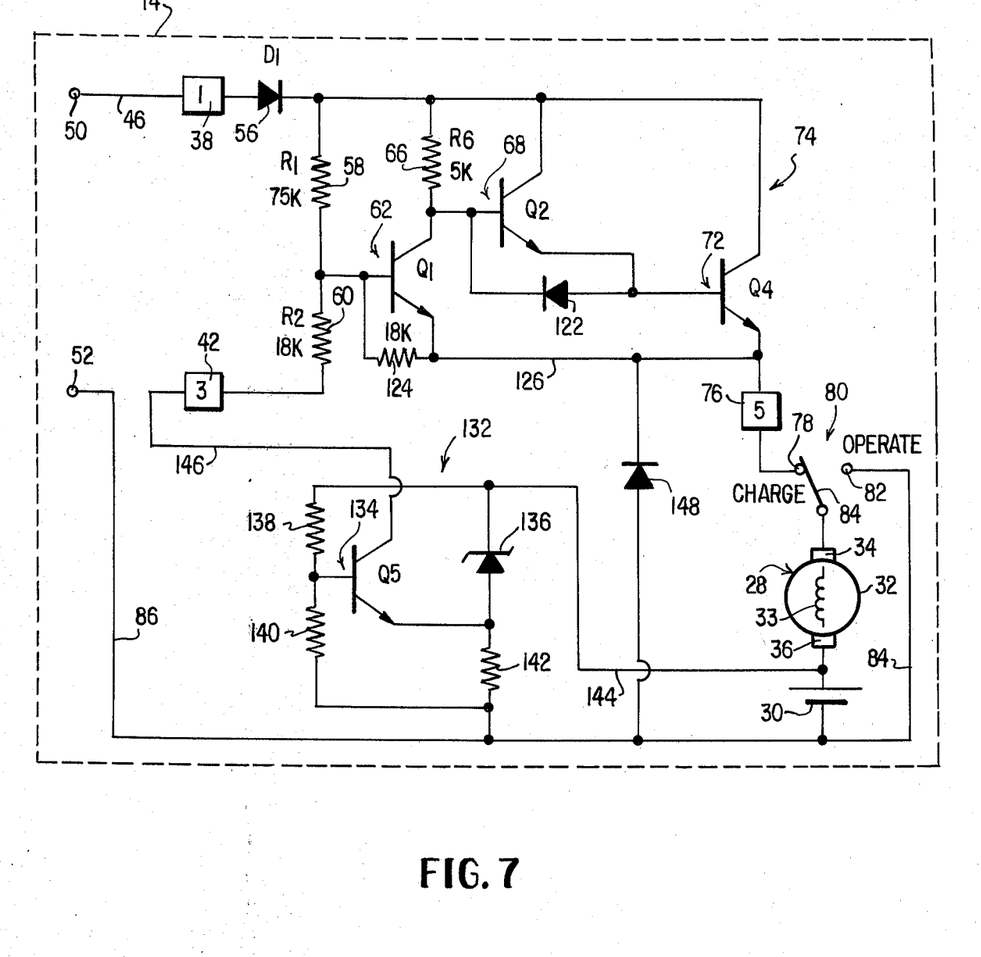
FIG. 7 shows the charger of FIG. 6 incorporating an automatic charging rate circuit.

FIG. 7 shows the modified basic charger 120 of FIG. 6 incorporating an automatic charging rate circuit generally indicated at 132 in FIG. 7. The charging rate circuit comprises a further transistor 134 (Q5), a zener diode 136, and resistors 138, 140 and 142. This charging circuit is connected by a lead 144 to one side of battery 30 and by a lead 146 to the terminal 42. FIG. 7 also shows a sustaining diode 148 connected across the battery and motor.

The charging rate circuit 132 of FIG. 7 acts to connect the lower terminal of resistor 60 to the input terminal 52 until the battery 30 is fully charged. When the battery is charged the transistors 134 (Q5) ceases to conduct, disconnecting the lower end of resistor 60 from terminal 52 and allowing the base of switching transistor 62 (Q1) to increase positively by approximately 2.7 volts thereby turning transistor 62 on and turning the Darlington amplifier off regardless of the amplitude of the input voltage at input terminals 50 and 52.

It should be noted that the basic charging circuit of FIG. 6 does not include a sustaining diode corresponding to the diode 148 of FIG. 7. In battery operated hand tools of the type described the hand tool motor possesses only a small amount of inductance (approximately 50 microhenries) and this does not provide a significant amount of current storage when switching at the frequency of a conventional 60 Hz power supply. Thus, for motors with small inductance sustaining diodes such as the diode 74 of FIGS. 2 and 3 and the diode 148 of FIG. 7 are not required. They have been shown in these circuits since they are relatively inexpensive and are of value for charging motors having significantly larger inductance. Furthermore, when switching at a high frequency rate as in the embodiment of FIG. 4 when the capacitor 100 has sufficient capacitance to form a relaxation oscillator the sustaining diode 74 is useful. On the other hand, the small amount of inductance i.e., approximately 50 microhenries is very effective in the feedback arrangement of FIGS. 6 and 7 for improved switching.

When the charger of the present invention is operated from a conventional 60 Hz AC power line it causes an audible hum due to the vibration of the motor. This is useful as an indicator when the automatic charging rate circuit is employed because the hum stops when the battery is fully charged. A further feature of the present invention is that it provides inherent protection against over charging the battery when the battery temperature is too high. That is, the charger of the present invention is incorporated directly in the housing 14 in close proximity to the battery being charged. The transistor junction voltages tend to decrease with an increase in temperature so that switching transistor 62 causes charging current to decrease with increasing temperature so as not to become excessive.

A further feature of the present invention resides in the fact that the circuit of FIG. 7 incorporating the automatic charge rate circuit 132 makes it possible to charge cordless tool batteries from DC power supplies such as from the batteries in an auto, truck or boat. In this case, the Darlington amplifier stays on until the battery is fully charged and then turns off. If desired, a small incandescent light or other resistant ballast may be placed in series with a polarized power cord to indicate whether or not the battery is charged. Such an incandescent light or other resistant ballast may also be used in series with the power cord when charging from a conventional AC supply so that the Darlington amplifier stays on continuously until the battery is fully charged and then turns off the light to indicate when the battery is charged.

By way of example only, the transistor 134 (Q5) of FIG. 7 may be of the type identified as GE-32 and zener diode 136 may be of the type identified as HEP Z0212. The zener voltage is 5.1 volts.

While the invention has been described in conjunction with charging a hand tool battery through the inductance of the hand tool motor, it is understood that when space in the hand tool housing permits, a separate inductance may be incorporated in the housing and the battery charged through it, or through a combination of the separate inductance and the hand tool motor inductance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A battery operated hand tool comprising a housing, an electrical motor in said housing for operating said tool, means in said housing for coupling said motor to a rechargeable battery, a battery charging circuit in said housing coupled to said motor for charging a battery in said housing in series with an inductance of said motor, said charging circuit comprising a pair of input terminals, a solid state switch connected to said terminals for causing the current from said terminals to flow through said motor, said charging circuit comprising means for automatically varying the charging rate in accordance with the charge on a battery, said solid state switch comprising a transistor, said automatic rate varying means comprising a positive feedback resistor coupling one side of said motor to the emitter-collector circuit of said transistor, and a negative feedback transistor coupling the other side of said motor to the base of said transistor.

2. A hand tool according to claim 1 including a capacitor in parallel with said positive feedback resistor.

3. A charging circuit for a battery comprising first and second input terminals, a rectifier and transistor amplifier coupling said first terminal to one side of said battery, a solid state switch coupled to said amplifier for controlling the flow of current through said amplifier to said battery, means coupling said switch to said terminals for operating said switch during a portion of each cycle of an AC input applied to said terminals, means coupling the second of said input terminals to the other side of said battery, an inductance, said inductance comprising a winding of an electric motor, said charging circuit including means for coupling said battery and said motor winding in series between said amplifier and said second input terminal, said solid state switch comprising a transistor, a voltage divider coupling said terminals to the base of said transistor, a positive feedback resistor coupling said inductance and battery to the emitter-collector circuit of said transistor, and a negative feedback resistor coupling said inductance and battery to the base of said transistor.

4. A charging circuit according to claim 3 including a capacitor coupled to said positive feedback resistor to increase the switching speed of said transistor.

5. A charging circuit according to claim 4 wherein said capacitor forms part of a blocking oscillation circuit for imparting a plurality of charging impulses to said battery during each cycle of the AC input.

6. A battery charging circuit comprising first and second input terminals, a rectifier coupled to said terminals for rectifying an AC input applied to said terminals, a battery, a transistor amplifier coupling said rectifier to said battery whereby rectified current from said terminals flows through said amplifier to said battery, a transistor switch having first and second controlled terminals connected in parallel with said amplifier and battery, said switch having a third control terminal, and means coupling said control terminal to said rectifier whereby said switch is rendered conductive and shunts current around said amplifier and battery when the input voltage exceeds a predetermined value, said switch being rendered non conductive when the input voltage falls below said predetermined value, said switch permitting current flow through said amplifier to said battery when a conventional 60 Hz household outlet electrical source is applied to said input terminals only during those portions of a source cycle when the source voltage is below a predetermined voltage level substantially less than its maximum.

7. A charging circuit according to claim 6 including a relatively large resistor in series with said transistor switch whereby current flow through said switch when in its conductive state is minimized.

8. A charging circuit according to claim 7 including an inductance, said inductance comprising a winding of an electric motor, said charging circuit including means for coupling said battery and said motor winding in series between said amplifier and one of said input terminals.

9. A charging circuit according to claim 7 including a battery operated hand tool comprising a housing, an electric motor in said housing for operating said tool, means in said housing for coupling said motor to said battery, said charging circuit being wholly contained within said housing whereby said battery may be recharged from a 117 volt 60 Hz household outlet by a simple cord connection to said housing.

10. Apparatus according to claim 9 including an inductance in said housing, said inductance comprising the armature winding of said motor, said charging circuit including switch means in said housing for charging said battery in series with said armature winding.

11. Apparatus according to claim 10 including a rectifier diode coupled to said battery for sustaining current flow through said battery after current flow from said input terminals has been directed through said amplifier.

12. A charging circuit according to claim 7 including an oscillator coupling said input terminals to said battery whereby a plurality of charging impulses pass through said battery during each cycle of the AC input to said terminals.

13. A charging circuit according to claim 7 wherein said means coupling said input terminals to said switch control terminal comprises a voltage divider.

14. A charging circuit according to claim 13 including a rectifier diode coupling said input terminals to said amplifier.

15. A charging circuit according to claim 14 wherein said amplifier comprises a Darlington amplifier.

16. A charging circuit according to claim 14 wherein said switch comprises a transistor having as controlled terminals an emitter and collector, and as a control terminal a base.

17. A charging circuit according to claim 14 including an automatic charging rate controlling circuit coupling said battery to said switch.

18. A charging circuit according to claim 17 wherein said automatic charging rate controlling circuit comprises a transistor and a zener diode.

* * * * *

UNITED STATES PATENT OFFICE
CERTIFICATE OF CORRECTION

Patent No. 3,970,912  Dated July 20, 1976

Inventor(s) Phillip A. Hoffman

It is certified that error appears in the above-identified patent and that said Letters Patent are hereby corrected as shown below:

Column 4, line 54, "$R'$" should read -- $R'2$ --.

Signed and Sealed this

Twenty-sixth Day of April 1977

[SEAL]

Attest:

RUTH C. MASON  
Attesting Officer

C. MARSHALL DANN  
Commissioner of Patents and Trademarks